United States Patent
Namura et al.

(10) Patent No.: US 12,017,470 B2
(45) Date of Patent: Jun. 25, 2024

(54) RESIN COMPOSITION FOR BACK-SURFACE LAYER AND HEAT-SENSITIVE TRANSFER RECORDING MATERIAL

(71) Applicant: DAINICHISEIKA COLOR & CHEMICALS MFG. CO., LTD., Tokyo (JP)

(72) Inventors: Mikiyoshi Namura, Tokyo (JP); Takeshi Kawaguchi, Tokyo (JP); Motoaki Umezu, Tokyo (JP)

(73) Assignee: Dainichiseika Color & Chemicals Mfg. Co., Ltd., Tokyo (JP)

( * ) Notice: Subject to any disclaimer, the term of this patent is extended or adjusted under 35 U.S.C. 154(b) by 0 days.

(21) Appl. No.: 18/547,780

(22) PCT Filed: Mar. 3, 2022

(86) PCT No.: PCT/JP2022/009014
§ 371 (c)(1),
(2) Date: Aug. 24, 2023

(87) PCT Pub. No.: WO2022/191016
PCT Pub. Date: Sep. 15, 2022

(65) Prior Publication Data
US 2024/0092109 A1 Mar. 21, 2024

(30) Foreign Application Priority Data
Mar. 12, 2021 (JP) .................. 2021-040462

(51) Int. Cl.
*B41M 5/44* (2006.01)
*C09D 175/06* (2006.01)
*C08G 18/40* (2006.01)
*C08G 18/65* (2006.01)

(52) U.S. Cl.
CPC ........... *B41M 5/443* (2013.01); *C09D 175/06* (2013.01); *B41M 2205/30* (2013.01); *B41M 2205/36* (2013.01); *C08G 18/4009* (2013.01); *C08G 18/6511* (2013.01)

(58) Field of Classification Search
CPC .............. B41M 5/443; B41M 2205/30; B41M 2205/36; C08G 18/4009; C08G 18/6511; C09D 175/06
See application file for complete search history.

(56) References Cited

U.S. PATENT DOCUMENTS

| | | | | |
|---|---|---|---|---|
| 4,925,735 | A * | 5/1990 | Koshizuka ............ | B41M 5/443 428/447 |
| 5,462,911 | A | 10/1995 | Takao et al. | |
| 5,470,818 | A | 11/1995 | Nakamura et al. | |
| 5,705,451 | A | 1/1998 | Takao et al. | |
| 5,955,399 | A | 9/1999 | Takao et al. | |
| 2001/0016557 | A1 | 8/2001 | Takao et al. | |
| 2012/0231184 | A1 | 9/2012 | Hanada et al. | |
| 2020/0307294 | A1 | 10/2020 | Harada | |

FOREIGN PATENT DOCUMENTS

| | | |
|---|---|---|
| CN | 102666655 | 9/2012 |
| CN | 109476168 | 3/2019 |
| JP | 06-079978 | 3/1994 |
| JP | 07-117371 | 5/1995 |
| JP | 07-205557 | 8/1995 |
| JP | 2001-328348 | 11/2001 |
| JP | 2001-353972 | 12/2001 |

(Continued)

OTHER PUBLICATIONS

Chinese Office Action, issued in the corresponding Chinese patent application No. 202280017915.6, dated Jan. 4, 2024, 7 pages.
International Search Report, issued in the corresponding PCT application No. PCT/JP2022/009014, dated May 17, 2022, 6 pages (including translation).
Machine Translation of the Chinese Office Action, issued in the corresponding Chinese patent application No. 202280017915.6, dated Jan. 4, 2024, 5 pages, (previosyly cited in the Information Disclosure Statement, filed Feb. 2, 2024 without the translation).

*Primary Examiner* — Gerard Higgins
(74) *Attorney, Agent, or Firm* — HSML P.C.

(57) ABSTRACT

There are provided a useful resin composition for a back-surface layer and a heat-sensitive transfer recording material using the same, wherein under the circumstances where the temperature of thermal heads has been increased, the back-surface layer of the formed heat-sensitive transfer recording material has more excellent heat resistance, damage to a thermal head can be alleviated, and durability is excellent in that bleeding is suppressed even if the silicone content is increased. The present invention provides a resin composition for a back-surface layer to be used for forming a back-surface layer of a heat-sensitive transfer recording material, the resin composition containing, as film-forming components, a siloxane-modified urethane- or urea-based resin A, a resin B, and a cross-linking agent C, wherein the resin A contains a polysiloxane component in a range of 5 to 55%, the resin B has at least one active-hydrogen-containing group and has a glass transition point of lower than 100° C., and when the total amount of the resin A, resin B, and the cross-linking agent C is assumed to be 100%, the resin A is contained within a range of 1 to 79%, the resin B is contained within a range of 1 to 79%, and the cross-linking agent C is contained within a range of 20 to 80%. The present invention also provides a heat-sensitive transfer recording material using the resin composition for a back-surface layer.

9 Claims, No Drawings

(56) References Cited

FOREIGN PATENT DOCUMENTS

| JP | 2002-192841 | 7/2002 |
|----|-------------|--------|
| JP | 3505995 | 3/2004 |
| JP | 2006-306017 | 11/2006 |
| JP | 2011-116035 | 6/2011 |
| JP | 2020-131587 | 8/2020 |

* cited by examiner

RESIN COMPOSITION FOR BACK-SURFACE LAYER AND HEAT-SENSITIVE TRANSFER RECORDING MATERIAL

TECHNICAL FIELD

The present invention relates to a resin composition for a back-surface layer and a heat-sensitive transfer recording material. In detail, the present invention relates to a technique for providing a heat-sensitive transfer recording material that enables excellent heat-sensitive transfer recording, and this technique can be realized by providing a resin composition for a back-surface layer, the resin composition that enables formation of a back-surface layer that not only exhibits high heat-resistant sliding properties which can support increases in the temperature of thermal heads but also has excellent durability.

BACKGROUND ART

A back-surface layer (heat-resistant sliding layer) of a heat-sensitive transfer recording material which is used in a thermal recording system is called, for example, a back-coat layer in ink ribbons. The back-surface layer is provided mainly for imparting heat-resistant sliding properties to a thermal head during printing. In recent years, there have been increasing demands for improvements in printed image quality, improvements in printing speed, improvements in durability of printed materials, and the like, and as means for meeting these demands, processes of increasing the temperature of a thermal head have been adopted. Increasing the temperature of a thermal head enables more excellent heat-sensitive transfer recording; however, realization of higher performance is required for the back-surface layer which is used in that case with regard to "heat resistance (sticking prevention ability)," "alleviation of damage to a thermal head (reduction of dregs)," "reduction of migration (low migration)," and the like.

In the past, studies on a resin composition for forming a back-surface layer have been conducted, and various proposals have been made. Facing the increases in the temperature of thermal heads, the applicant of the present application has disclosed in Patent Literature 1 use of a siloxane-modified urethane- or urea-based resin A and a heat-resistant polymer B as film-forming components in a particular ratio, and further for the purpose of making the heat resistance of the back-surface layer sufficient, use of a heat-resistant polymer having a glass transition temperature of 100° C. or higher, preferably 140° C. or higher, as the heat-resistant polymer B. Making the composition of the film-forming components into the one as described above enables providing a heat-sensitive recording material having a back-surface layer having high heat-resistant sliding properties which supports increases in the temperature of thermal heads.

Patent Literature 2 discloses prevention of falls of fillers and reduction of dreg adhesion by means of heat-curing of a heat-resistant sliding layer with a silicone-modified resin and a thermal cross-linking agent and addition of a filler component. Then, Patent Literature 2 states that a thermal transfer sheet that can sufficiently support high-energy printing is provided.

Patent Literature 3 discloses a heat-resistant sliding layer formed of a heat-cured film containing: as a main component, a reaction product of a reactive group-containing thermoplastic resin, a silicone-modified resin compound having a reactive group, and an isocyanate compound; and as a lubricant, fine organic resin particles. Then, Patent Literature 3 states that as for the heat-resistant sliding layer, by using a cured film (cross-linked film), sufficient heat resistance can be obtained; by using, as lubricants, the silicone-modified resin compound and the fine organic resin particles, sufficient running properties can be realized and occurrence of scratches on a surface protection layer of a thermal head can be prevented; and further, by using the silicone-modified resin compound exhibiting good compatibility with a base resin, a uniform coating film can easily be obtained.

Patent Literature 4 discloses a sliding, heat-resistant layer formed with a hydroxyl group-containing resin, a thermoplastic resin, a lubricant, and a cross-linking agent, wherein a thermoplastic resin having a glass transition temperature of 70° C. or higher is used as the thermoplastic resin, a cross-linked structure is formed by a reaction between the hydroxyl group-containing resin and the cross-linking agent, and a copolymer having a polysiloxane structure is used as the lubricant. Then, Patent Literature 4 states that the sliding, heat-resistant layer does not cause a fine, thin line or dropping out to occur in a recorded image, allows a recording head to exhibit excellent running stability due to sufficient sliding properties thereof, and exhibits good storage properties such that the sliding, heat-resistant layer does not cause fusion bonding thereof to a colorant layer and the sliding properties lowers only slightly even after wound storage under a high-temperature and high-humidity condition.

CITATION LIST

Patent Literature

Patent Literature 1: Japanese Patent Laid-Open No. 2011-116035
Patent Literature 2: Japanese Patent Laid-Open No. 2006-306017
Patent Literature 3: Japanese Patent Laid-Open No. 6-79978
Patent Literature 4: Japanese Patent No. 3505995

SUMMARY OF INVENTION

Technical Problem

As described above, conventional techniques disclose use of a polysiloxane-modified resin as a film-forming component in forming a back-surface layer of a thermal head mainly for imparting heat-resistant sliding properties, and such polysiloxane-modified resins are widely utilized. In addition, in order to form an excellent back-surface layer required for supporting increases in the temperature of thermal heads in recent years, disclosed are: an improvement in heat resistance, achievement of suppression of falls of fillers or lubricants, and the like by means of utilization of a highly heat-resistant polymer having a high glass transition temperature as a film-forming component or utilization of a reaction product between a resin having a reactive group and a cross-linking agent such as an isocyanate compound.

For example, as described above, the applicant of the present application has disclosed, with regard to a resin composition for a back-surface layer, use of a siloxane-modified urethane- or urea-based resin A and a heat-resistant polymer B as film-forming components in a particular ratio, and further for the purpose of making the heat resistance of the back-surface layer sufficient, use of a heat-resistant polymer having a glass transition temperature of 100° C. or higher, preferably 140° C. or higher, as the heat-resistant polymer B.

According to studies conducted by the present inventors, a polysiloxane-modified resin is extremely useful as a material for imparting heat-resistant sliding properties to a back-surface layer, but when the content of silicone (even if it is a copolymer) is increased in order to enhance the heat resistance, an unreacted silicone monomer may bleed and therefore worsening in migration has been unavoidable. For this reason, there has been a limitation in enhancing the heat resistance by increasing the content of silicone from the viewpoint of the balance between the enhancement of the heat resistance and the desired "low migration."

In contrast, according to the above-described technique provided by the applicant of the present application, there is provided a heat-sensitive transfer recording material having a back-surface layer that exhibits excellent performance, such as excellent heat resistance and suppression of lowering of printed image quality caused by migration from the back-surface layer. However, further studies conducted by the present inventors have shown that there is still room for improvement from the following viewpoints. In this conventional technique, a high-Tg resin is used as a film-forming component together with the polysiloxane-modified resin, but this high-Tg resin is hard and therefore is easily scraped, and powdery dregs adhere to a thermal head, which may cause head contamination. When formation of a back-surface layer having a composition by which this problem is suppressed can be realized, thereby the durability of a heat-sensitive transfer recording material (ink ribbon) and the contamination resistance of a thermal head can be enhanced more compared to those in the above-described conventional technique.

Accordingly, an object of the present invention is to provide a resin composition for a back-surface layer, which can realize a back-surface layer of a heat-sensitive transfer recording material, the back-surface layer satisfying the following performance under the circumstances where the temperature of thermal heads has been increased. Specifically, an object of the present invention is to provide a resin composition for a back-surface layer having excellent durability. As a result, the formed back-surface layer of a heat-sensitive transfer recording material prevents sticking (fusion bonding); causes no problem in running; has more excellent heat resistance and also has excellent adhesiveness; suppresses head contamination, such as adhesion of powdery dregs to a thermal head, enabling realization of alleviation of damage to a thermal head (reduction of dregs); and suppresses a material, such as a silicone monomer, for forming the back-surface layer from bleeding (migrating), making it possible to realize "low migration of silicone," even when the content of silicone is increased. Another object of the present invention is to provide a heat-sensitive transfer recording material that enables heat-sensitive transfer recording satisfying requirements for improvements in printed image quality, improvements in printing speed, improvements in durability of printed materials, and the like in recent years by realization of providing a resin composition for a back-surface layer, which can form a back-surface layer that exhibits more excellent performance as described above at a level capable of supporting the increases in the temperature of thermal heads.

Solution to Problem

The above-described objects are achieved by the present invention, described below. That is, the present invention provides a resin composition for a back-surface layer, described below.

[1] A resin composition for a back-surface layer, to be used for forming a back-surface layer of a heat-sensitive transfer recording material having a heat-sensitive transfer recording layer provided on one surface of a substrate sheet and a back-surface layer provided on the other surface, the resin composition comprising, as film-forming components:
  a siloxane-modified urethane- or urea-based resin A;
  a resin B; and
  a cross-linking agent C, wherein
    the resin A comprises a polysiloxane component in a range of 5 to 55% by mass,
    the resin B is at least any one selected from the group consisting of polyester polyols, polycarbonate polyols, polyether polyols, caprolactone polyols, polyvinyl acetals, polyvinyl butyral, epoxy polyols, and silicone polyols each having at least one active-hydrogen-containing group in one molecule and having a glass transition point (Tg) of lower than 100° C., and
    when the total amount of the resin A, resin B, and the cross-linking agent C is assumed to be 100% by mass, the resin A is contained within a range of 1 to 79% by mass, the resin B is contained within a range of 1 to 79% by mass, and the cross-linking agent C is contained within a range of 20 to 80% by mass.

Preferred embodiments of the resin composition for a back-surface layer include the following.

[2] The resin composition for a back-surface layer according to [1], wherein the resin B has a hydroxyl value (OHv) of 22 to 900 mgKOH/g.

[3] The resin composition for a back-surface layer according to [1] or [2], wherein the resin B is at least any one selected from the group consisting of polyester polyols, polycarbonate polyols, and polyether polyols.

[4] The resin composition for a back-surface layer according to any one of [1] to [3], wherein the resin B has a molecular weight of 200 to 100000.

[5] The resin composition for a back-surface layer according to any one of [1] to [4], wherein
  the resin A has a reaction product formed of, as components for forming the reaction product, a polysiloxane compound (a) having at least one active-hydrogen-containing group in one molecule, an isocyanate compound (b), and a polyol and/or a polyamine (c), or the resin A has a reaction product formed of, as components for forming the reaction product, an isocyanate compound (b) and a polysiloxane polyol and/or a polysiloxane polyamine (c'); and
  the reaction product is obtained by reacting isocyanate groups and all of the active-hydrogen-containing groups at a molar ratio of NCO/active-hydrogen-containing group=0.9 to 2.1 and has a number average molecular weight of 2000 to 500000.

[6] The resin composition for a back-surface layer according to any one of [1] to [5], wherein the cross-linking agent C is a polyisocyanate, and the polyisocyanate is blended in such a way that a ratio of an isocyanate group of the cross-linking agent to the active-hydrogen-containing group of the resin B satisfies NCO/active-hydrogen-containing group=0.3 to 30.

[7] The resin composition for a back-surface layer according to any one of [1] to [6], wherein the cross-linking agent C comprises a carbodiimide cross-linking agent or an oxazoline cross-linking agent.

[8] The resin composition for a back-surface layer according to any one of [1] to [7], wherein the resin composition is of a two-liquid type consisting of a mixed liquid comprising the resin A and the resin B, and a liquid comprising the cross-linking agent C, or is of a three-liquid type consisting of a liquid comprising the resin A, a liquid comprising the resin B, and a liquid comprising the cross-linking agent C.

The present invention provides, as another embodiment, a heat-sensitive transfer recording material, described below.

[9] A heat-sensitive transfer recording material comprising:
a heat-sensitive transfer recording layer provided on one surface of a substrate sheet; and
a back-surface layer provided on the other surface, wherein the back-surface layer is formed of the resin composition for a back-surface layer according to any one of [1] to [8].

Advantageous Effects of Invention

The present invention can provide a resin composition for a back-surface layer, with which a back-surface layer that forms a heat-sensitive transfer recording material can be made into one in which higher performance can be realized as follows at a level capable of supporting the increases in the temperature of thermal heads: the back-surface layer prevents sticking (fusion bonding); causes no problem in running; has more excellent heat resistance and also has excellent adhesiveness; suppresses adhesion of powdery dregs to a thermal head, enabling realization of alleviation of damage to a thermal head (reduction of dregs); suppresses silicone from migrating to another member even when the amount of a polysiloxane in the material that forms the back-surface layer is large; and has excellent durability. In addition, the present invention can provide a heat-sensitive transfer recording material that enables heat-sensitive transfer recording satisfying requirements for improvements in printed image quality, improvements in printing speed, improvements in durability of printed materials, and the like in recent years by realization of providing a resin composition for a back-surface layer, which can form a back-surface layer that exhibits excellent performance as described above.

DESCRIPTION OF EMBODIMENTS

Next, the present invention will be described in more detail giving preferred embodiments. A resin composition for a back-surface layer of the present invention contains, as film-forming components, a siloxane-modified urethane- or urea-based resin A, a resin B, and a cross-linking agent C; the resin A contains a polysiloxane component in a range of 5 to 55% by mass, the resin B is a particular resin having at least one active-hydrogen-containing group in one molecule and having a glass transition point (Tg) of lower than 100° C.; and when the total amount of the resin A, the resin B, and the cross-linking agent C is assumed to be 100% by mass, the resin A is contained within a range of 1 to 79% by mass, the resin B is contained within a range of 1 to 79% by mass, and the cross-linking agent C is contained within a range of 20 to 80% by mass.

Each material that composes the above-described resin composition for a back-surface layer of the present invention will be described.

[Siloxane-Modified Urethane- or Urea-Based Resin A]

The resin A which is used in the present invention has sliding properties due to siloxane bonds in the structure thereof and is useful as a material for a back-surface layer in a heat-sensitive transfer recording material for which heat-resistant sliding properties are required, and therefore the resin A has been used in various cases. However, as described above, when the content of silicone (even if it a copolymer) is increased in order to enhance the heat resistance, an unreacted silicone monomer may bleed, and therefore worsening of migration has been unavoidable. In contrast, in the present invention, the content of silicone as a film-forming component is increased in order to realize high heat-resistant sliding properties in the back-surface layer, and therefore the resin A containing a polysiloxane component in a range of 5 to 55% by mass is used. The resin A containing a polysiloxane component in a range of preferably 7 to 55% by mass, more preferably 20 to 50% by mass, is used.

According to studies conducted by the present inventors, adopting a composition in which such a resin A whose polysiloxane component content is high is used makes it possible to make the composition of the present invention into one in which the content of the polysiloxane component in the film-forming components is high, as high as 1.9 to 8.5% by mass, more preferably 3 to 8% by mass. According to studies conducted by the present inventors, it is not preferable that the content of the polysiloxane component in the film-forming components is more than 8.5% by mass because the effect of low migration is not necessarily obtained stably and sufficiently. In addition, it is not preferable that the content of the polysiloxane component in the film-forming components is less than 1.9% by mass because when a back-surface layer is formed, the back-surface layer does not have sufficient heat-resistant sliding properties.

The present inventors consider the reason why the migration of silicone in the formed back-surface layer can be reduced even though the concentration of the polysiloxane component contained in the film-forming components in the present invention is high, is due to the following reason. That is, it is considered that by using a siloxane-modified urethane- or urea-based resin A as a film-forming component and using the resin B having at least one active-hydrogen-containing group in one molecule and the cross-linking agent C together with the resin A, a strong film is formed by a reaction of these A, B, and C, specifically by a reaction between B and C, or in some cases by a reaction between A and C, which enables effective prevention of bleeding-out of the silicone component. Details on the resin B and the cross-linking agent C to be used together with the resin A will be described later.

The applicant of the present application have already disclosed a combination of a siloxane-modified urethane- or urea-based resin and a heat-resistant polymer having a glass transition point (Tg) of 100° C. or higher, preferably 140° C. or higher as a composition of film-forming components capable of forming a more highly heat-resistant sliding layer required when printing is performed using a higher-temperature thermal head, which has been desired in recent years. As described above, one of the objects of the present invention is to improve a problem that when a resin having a high glass transition point (Tg) is used together, the resin is hard and therefore is easily scraped, which may cause powdery dregs to adhere to a thermal head, and this problem is solved by using a material in which the content of the polysiloxane component is high as a siloxane-modified urethane- or urea-based resin A and devising a component to be used together with the resin A. Therefore, the resin A that is a constituent of the present invention may be one that contains a polysiloxane component in a range of 5 to 55% by mass, and basically, any of siloxane-modified urethane- or urea-based resins having the same structures as those used in the above-described conventional technique can be used. Accordingly, any of the siloxane-modified urethane- or urea-based resins disclosed in Japanese Patent Laid-Open No. 2011-116035 can be used as the resin A of the present invention as long as the content of the polysiloxane component specified in the present invention is satisfied.

For example, as the resin A, the resin A having a composition as described below can suitably be used. Examples of such resin A include the resin A having a reaction product formed of, as components for forming the reaction product, a polysiloxane compound (a) having at least one active-hydrogen-containing group in one molecule, an isocyanate compound (b), and a polyol and/or a polyamine (c), or the resin A having a reaction product formed of, as components for forming the reaction product, an isocyanate compound (b) and a polysiloxane polyol and/or a polysiloxane polyamine (c'), wherein the reaction product is obtained by reacting isocyanate groups and all of the active-hydrogen-containing groups at a molar ratio of NCO/active-hydrogen-containing group=0.9 to 2.1 and has a number average molecular weight of 2000 to 500000. For example, the reaction product having a number average molecular weight of 9000 to 200000 is suitable. Note that the resin A which is used in the present invention can be obtained by a synthesis method disclosed in Japanese Patent Laid-Open No. 2011-116035, described above.

In the present invention, urethane or urea is a general name including polyurethane, polyurea, and polyurethane-polyurea. In addition, the active-hydrogen-containing group described above refers to a group having reactivity with an isocyanate group and having active hydrogen, such as a hydroxy group, a mercapto group, a carboxy group, or an amino group.

[Resin B Having at Least One Active-Hydrogen-Containing Group in One Molecule]

As described above, in the present invention, the composition of the film-forming components is made in such a way that the resin B having at least one active-hydrogen-containing group in one molecule and the cross-linking agent C are used together with the siloxane-modified urethane- or urea-based resin A having the above-described composition in order to achieve the objects of the present invention, which thereby makes it possible to form a back-surface layer exhibiting more excellent performance. First of all, the resin B that characterizes the present invention is described.

For example, the resin B that is a constituent of the present invention is suitably one having a hydroxyl value (OHv) of 22 to 900 mgKOH/g. The resin B having a hydroxyl value (OHv) of 30 to 700 mgKOH/g is more preferably used. In addition, with regard to the molecular weight of the resin B, the resin B having a molecular weight of about 200 to about 100000 may be used although it depends on the polymerization units. For example, a low-molecular-weight polymer having a molecular weight of about 500 to about 3000 can also suitably be used.

Examples of the resin B which is used in the present invention include resins having a hydroxy group, such as polyester polyols, polycarbonate polyols, polyether polyols, caprolactone polyols, polyvinyl acetals, polyvinyl butyral, acrylic polyols, epoxy polyols, and silicone polyols, and at least one selected from the resins as given above may be used. Not to mention the resin B that is a constituent of the present invention is not limited to those having a hydroxy group, and the resin B may be one having an active-hydrogen-containing group, such as a mercapto group, a carboxy group, or an amino group, which has reactivity with a reactive group of the cross-linking agent C to be used together. For example, a polyamide amine, a polyamide-imide amine, a dimer acid, a trimer acid, or the like can also be used.

The combination of the siloxane-modified urethane- or urea-based resin A and the resin B in the film-forming components that are constituents of the present invention is preferably set to 50 to 600 parts by mass of the resin B based on 100 parts by mass of the resin A. The resin B is more preferably used in a range of 100 to 400 parts by mass based on 100 parts by mass of the resin A. Such combination makes it possible to increase the polysiloxane component in the film-forming components.

[Cross-Linking Agent C]

As the cross-linking agent that reacts with an active hydrogen group of the resin B or an active hydrogen group of the resin A, an isocyanate-based cross-linking agent is preferable. The isocyanate-based cross-linking agent is not particularly limited, and a known, general-purpose polyisocyanate can be used. With regard to the use amount of the cross-linking agent C, when the cross-linking agent C is a polyisocyanate, the cross-linking agent C is preferably blended in such a way that the ratio of the isocyanate group of the cross-linking agent to the active-hydrogen-containing group of the resin B satisfies NCO/active-hydrogen-containing group=0.3 to 30. The blending amount more preferably satisfies NCO/active-hydrogen-containing group=0.5 to 20.0.

Examples of suitable isocyanate-based cross-linking agents which are used in the present invention include a dimer of 2,4-toluylene diisocyanate, triphenylmethane triisocyanate, tris-(p-isocyanatephenyl)thiophosphite, multifunctional aromatic isocyanates, multifunctional aromatic-aliphatic isocyanates, multifunctional aliphatic isocyanates, fatty acid-modified multifunctional aliphatic isocyanates, block type polyisocyanates such as blocked multifunctional aliphatic isocyanates, and polyisocyanate prepolymers.

Of these isocyanate-based cross-linking agents, any of the aromatic isocyanates and the aliphatic isocyanates can be used. The isocyanate-based cross-linking agent is preferably diphenylmethane diisocyanate or tolylene diisocyanate among the aromatic isocyanates, or is preferably a modified product, such as hexamethylene diisocyanate or isophorone diisocyanate, among the aliphatic isocyanates, or the isocyanate-based cross-linking agent is preferably one having 3 or more isocyanate groups in one molecule. A multimer of any of the above-described polyisocyanates, or an adduct of any of the above-described polyisocyanates with another compound, a urethane prepolymer obtained by reacting any of the above-described polyisocyanates and a low-molecular-weight polyol or polyamine in such a way as to form isocyanate at each end, or the like can also preferably be used.

With regard to the use amount of the isocyanate-based cross-linking agent in the film-forming components that are constituents of the present invention, the cross-linking agent is preferably blended in such a way that the ratio of the isocyanate group of the cross-linking agent to the active-hydrogen-containing group of the resin B satisfies NCO/active-hydrogen-containing group=0.3 to 30. The isocyanate-based cross-linking agent may more preferably be blended in such a way as to satisfy NCO/active-hydrogen-containing group=0.5 to 20.0, still more preferably NCO/active-hydrogen-containing group=0.85 to 6.5.

In the present invention, a carbodiimide-based cross-linking agent or an oxazoline-based cross-linking agent can be used in addition to the isocyanate-based cross-linking agent. For example, in the case where the resin A is synthesized using a polyol having a carboxy group and such acid-modified resin A is used, the carbodiimide-based cross-linking agent or the oxazoline-based cross-linking agent, which have reactivity with a carboxy group, may appropriately be used in addition to the isocyanate-based cross-linking agent.

[Additives]

In the resin composition for a back-surface layer of the present invention, additives, such as lubricants (wax, surfactant, metal soap, and silicone-based oil), organic and inorganic fillers, and antistatic agents, can also be blended as necessary in addition to the above-described resin A, resin B, and cross-linking agent C. When one, or two or more of these additives are added in a range not impairing the performance of the film-forming components that are constituents of a back-surface layer, thereby, for example, the heat resistance and sliding properties of a back-surface layer can further be improved, and cleanliness of a thermal head and antistatic properties, and the like can further be improved. With regard to the amount of the additives to be blended on that occasion, the additives are preferably used in a range of about 0.1 to about 20 parts by mass in 100 parts by mass of the film-forming components. As for the additives to be used in the present invention, any of the additives disclosed in Japanese Patent Laid-Open No. 2011-116035, described above, can be used.

[Combination]

As described above, the resin composition for a back-surface layer of the present invention contains the above-described siloxane-modified urethane- or urea-based resin A, the above-described resin B having an active-hydrogen-containing group, and the above-described cross-linking agent C, and contains additives as necessary. Then, the resin composition for a back-surface layer of the present invention is required to contain, in terms of solid content, the resin A within a range of 1 to 79% by mass, the resin B within a range of 1 to 79% by mass, and the cross-linking agent C within a range of 20 to 80% by mass when the total amount of the resin A, the resin B, and the cross-linking agent C is assumed to be 100% by mass. The cross-linking agent C is preferably blended in an amount of 29% by mass or more. According to studies conducted by the present inventors, when the total amount of the resin A, the resin B, and the cross-linking agent C is assumed to be 100% by mass in terms of solid content, the resin A, the resin B, and the cross-linking agent C are more preferably blended in such a way as to be contained within a range of 10 to 33% by mass, within a range of 25 to 40% by mass, and within a range of 33 to 50% by mass, respectively.

In addition, the resin B is preferably blended within a range of 50 to 600 parts by mass in terms of solid content based on 100 parts by mass of the resin A. The resin B is more preferably blended in a range of 100 to 400 parts by mass based on 100 parts by mass of the resin A.

Further, in the resin composition for a back-surface layer of the present invention, the cross-linking agent is preferably blended in such a way that the amount of the isocyanate group of the cross-linking agent in terms of solid content in the blended liquid based on the total amount of the active hydrogen group of the resin B satisfies NCO/active-hydrogen-containing group=0.3 to 30. More preferably, the isocyanate-based cross-linking agent may be blended in such a way as to satisfy NCO/active-hydrogen-containing group=0.5 to 20.0, still more preferably satisfy NCO/active-hydrogen-containing group=0.85 to 6.5.

Furthermore, as the siloxane-modified urethane- or urea-based resin A that is a constituent of the resin composition for a back-surface layer of the present invention, the resin A containing 5 to 55 parts by mass of the polysiloxane component in terms of solid content in 100 parts by mass of the resin A needs to be used. The resin A preferably containing 7 to 55 parts by mass of the polysiloxane component, more preferably containing 20 to 50 parts by mass of the polysiloxane component, is used. Then, the resin composition for a back-surface layer of the present invention obtained by using such a resin A preferably contains 1.9 to 8.5 parts by mass of the polysiloxane component, more preferably contains the polysiloxane component in a range of 4.5 to 7 parts by mass, in 100 parts by mass of the solid content in the blended liquid, which enables formation of a back-surface layer exhibiting high heat-resistant sliding properties.

As described above, the resin composition for a back-surface layer of the present invention contains the siloxane-modified urethane- or urea-based resin A, the above-described resin B having an active-hydrogen-containing group, and the above-described cross-linking agent C. As a product, the resin composition for a back-surface layer of the present invention is preferably of a two-liquid type which is set in such a way that when a mixed liquid containing the resin A and the resin B, and a liquid containing the cross-linking agent C are mixed, the resultant mixed liquid satisfies the requirements of the present invention. According to studies conducted by the present inventors, when the resin A and the resin B are mixed in advance, and the cross-linking agent C is mixed with the resultant mixed liquid immediately before coating, a practical merit is thereby obtained that the solid content (resin component) of the resin composition for a back-surface layer can significantly be increased. That is, by increasing the solid content, a merit in production can be obtained that a step of drying a coating film (back-surface layer) can be shortened. Not to mention a three-liquid type resin composition may be prepared by setting a liquid containing the resin A, a liquid containing the resin B, and a liquid containing the cross-linking agent C so as to satisfy the requirements of the present invention when the liquids are mixed, and these liquids can also be mixed immediately before coating.

EXAMPLES

Hereinafter, the present invention will specifically be described based on Examples, but the present invention is not limited to these Examples. Note that "parts" and "%" in Examples and Comparative Examples are on a mass basis unless otherwise noted.

Synthesis Example 1 (Synthesis of Silicone-Modified Urethane Resin PU-1)

A reaction container equipped with a stirrer, a reflux condenser, a thermometer, a nitrogen blow tube, and a manhole was prepared, and the air inside the reaction container was replaced with a nitrogen gas. In the reaction container after the replacement, 16 parts of KF-6003 (trade name, manufactured by Shin-Etsu Chemical Co., Ltd., dual-end type silicone diol) having a hydroxyl value (OHv) of 22 mgKOH/g as compound (a), 100 parts of CD-220 (trade name, manufactured by Daicel Corporation, poly(hexamethylene carbonate)diol, molecular weight 2000) as compound (c), 10 parts of 1,3-butanediol (1,3-BD), and 71.7 parts of methyl ethyl ketone (MEK) as a reaction solvent were added.

Subsequently, 41.1 parts of diphenylmethane diisocyanate (MDI) as compound (b) was added as compound (b) to allow the reaction to progress at 80° C. Thirty minutes later, dibutyltin dilaurate was added as a catalyst by 0.1% of the total solid content, and the reaction was performed until the absorption at 2270 cm$^{-1}$ derived from a free isocyanate group disappeared in the infrared absorption spectrum. The reaction solution was diluted with methyl ethyl ketone as the viscosity increased, and the final solid content was adjusted to 30%. Thus, silicone-modified polyurethane resin PU-1 was obtained. The solid content (NV), content of the polysiloxane component, and number average molecular weight of PU-1 thus obtained were 30%, 9.6%, and 122000, respectively. The molecular weight is a value in terms of poly (methyl methacrylate), measured by GPC. Those described above are shown together in Table 1. In Table 1, the content of the polysiloxane component is represented by "Si Component %." The same applies to other tables.

Synthesis Examples 2 to 8 (Synthesis of Silicone-Modified Urethane Resin and Urethane Resin)

Silicone-modified polyurethane resins PU-2 to PU-5, PU-7, and PU-8 were synthesized in the same manner as in Example 1 except that the blending amounts of respective materials were changed to the blending amounts given in Table 1. PU-7 among these is an example where it is a siloxane-modified resin but does not fall under the resin A in that the amount of the polysiloxane component does not satisfy the amount required in the resin A specified in the present invention. In addition, PU-8 is an example of the resin A modified with an acid in that it is a siloxane-modified resin that falls under the resin A but was synthesized using dimethylol propionic acid having a carboxy group instead of using 1,3-butane diol, which makes PU-8 different from the other silicone-modified polyurethane resins. Further, PU-6, which is a urethane resin that is not modified with silicone and therefore does not fall under the resin A, was synthesized according to the blending amounts shown in Table 1.

Example 1 (Preparation of Resin Composition for Back-Surface Layer)

A resin composition (blended liquid) for a back-surface layer of the present example was prepared by mixing the following materials using, as the resin A, silicone-modified urethane resin PU-1 obtained in Synthesis Example 1, described above.

PU-1 (NV=30%) 100 parts

Polyester polyol 1 30 parts

Coronate L (NV=75%) 40 parts

MEK 1464 parts

Cyclohexanone 366 parts

Polyester polyol 1 used above is a reaction product of 1,4-butanediol and adipic acid and a liquid at 25° C., has a molecular weight of 500 and a hydroxyl value (OHv) of 224.4 mgKOH/g, and falls under the resin B.

Coronate L (trade name, manufactured by Tosoh Corporation, solid content 75%) used above is an isocyanate-based cross-linking agent, contains 13.2% of NCO, and falls under the cross-linking agent C. In the present example, 40 parts of the cross-linking agent was used. In the blended liquid, the calculated value of the ratio of the isocyanate group of the cross-linking agent to the active-hydrogen-containing group of the resin B (represented by NCO/OH in Tables) is 1.048. In addition, the calculated value of the ratio of the polysiloxane component blended (Si component/A+B+C) in the blended liquid in terms of solid content is 3.19%. This calculated value is represented by "Si Component %" in Tables. Those described above are shown together in Table 2-1(A).

Examples 2 to 6 (Preparation of Resin Composition for Back-Surface Layer)

Resin compositions (blended liquids) for a back-surface layer of Examples 2 to 6 were obtained respectively in the same manner as in Example 1 except that the combination of materials was changed to the combinations as shown in Table 2-1(A).

TPEP 1030 (trade name, manufactured by Tai Chin Chemical Industry Co., Ltd.), which is polyester polyol 2 used in Example 6, is a liquid at 80° C., has a molecular weight of 3000 and a hydroxyl value (OHv) of 37.4 mgKOH/g, and falls under the resin B.

TABLE 1

Synthesis of PU-1 to PU-8

(Parts)

| PU-No. | 1 | 2 | 3 | 4 | 5 | 6 | 7 | 8 |
|---|---|---|---|---|---|---|---|---|
| Poly (hexamethylene carbonate) diol *1 | 100 | 100 | 100 | 100 | 100 | 100 | 100 | 100 |
| 1,3-Butanediol | 10 | 10 | 10 | 5 | 5 | 12.5 | 10 | |
| Dimethylol propionic acid | | | | | | | | |
| Dual-end type silicone diol *2 | 16 | 40 | 70 | 130 | 210 | 0 | 7 | 15 |
| MDI | 41.1 | 42.2 | 43.7 | 32.8 | 36.7 | 47.2 | 40.6 | 31.9 |
| MEK (reaction + dilution) | 389.8 | 448.6 | 522.0 | 624.8 | 820.6 | 372.7 | 367.8 | 366.1 |
| Number average molecular weight | 122000 | 115000 | 104000 | 93000 | 90000 | 130000 | 124000 | 107000 |
| Si Component (%) | 9.6 | 20.8 | 31.3 | 48.5 | 59.7 | 0 | 4.4 | 9.6 |
| Solid content (%) | 30 | 30 | 30 | 30 | 30 | 30 | 30 | 30 |

*1 CD-220 (manufactured by Daicel Corporation): molecular weight MW = 2000
*2 KF-6003 (manufactured by Shin-Etsu Chemical Co., Ltd.): hydroxyl value = 22 mgKOH/g

[Evaluations]
(Preparation of Heat-Sensitive Transfer Recording Material)

Back-surface layers were formed as follows: the resin compositions (blended liquids) of Examples 1 to 6, obtained according to the above-described combinations, were used respectively to coat the surfaces of easy adhesion polyethylene terephthalate (PET) films (substrate sheets) having a thickness of 6 μm by gravure printing in such a way that the thickness after drying was 0.5 μm, and after the coating, the solvent was evaporated in a dryer.

On the surface opposite to each back-surface layer of the PET films (substrate sheets) each having a back-surface layer formed in the manner as described above, a coating liquid (paint for thermal transfer) for a heat-sensitive transfer recording layer (ink layer) was applied to form an ink layer, and thus heat-sensitive transfer recording materials of Examples 1 to 6 were prepared respectively. Specifically, the coating liquid whose composition is as described below was applied by a roll coating method using a hot-melt process to form an ink layer in such a way that the amount of the coating liquid applied was 5 g/m$^2$, and thus heat-sensitive transfer recording materials each having a different composition of the back-surface layer were obtained.

Coating liquid for heat-sensitive transfer recording layer (ink layer)
Paraffin wax 10 parts
Carnauba wax 10 parts
Polybutene (manufactured by ENEOS Corporation) 1 part
Carbon black 2 parts (Printing Method)

The heat-sensitive transfer recording materials obtained in the manner as described above were respectively mounted on a commercially available bar code printer to perform printing under the following conditions. Then, sticking properties, resistance to cause contamination to a thermal head, low migration of silicone, and adhesiveness between the back-surface layer and the substrate sheet were evaluated as described below. Evaluation results are shown together in Table 2-1(B).

(Evaluation Methods)
(1) Sticking Properties

When printing was performed in the case where each heat-sensitive transfer recording material was subjected to the mounting test, occurrence of wrinkles of the heat-sensitive transfer recording material, occurrence of sticking of the thermal head to the back-surface layer, and fusion bonding between the thermal head and the heat-sensitive recording material were visually observed to perform five-grade evaluation according to the following criteria. Further, when the evaluation was performed, a change in sound during running and feeding of the heat-sensitive transfer recording material was also taken notice of and taken into consideration. As for evaluation results, a score of 4 or higher is rated as acceptable (good), and a score of 3 or lower is rated as not acceptable (poor).

5: Sticking does not occur, and there is no problem in running.
4: Sticking does not occur, but there is a change in running sound.
3: Sticking somewhat tends to occur (slight sticking is recognized).
2: Sticking occurs, but running is possible.
1: Running becomes impossible due to sticking.

(2) Resistance to Cause Contamination to Thermal Head

Whether or not contamination to a head thermal element part of the thermal head occurs in the case where each heat-sensitive transfer recording material was subjected to the mounting test was observed with a digital microscope. In addition, whether or not powdery adherends were present at the thermal head part after the mounting test was visually observed to make comparison with the state thereof before running. Then, these observation results were comprehensively taken into consideration to perform three-grade evaluation according to the following criteria.

Excellent: Contamination of the thermal element does not occur, and powders are not present, and as result, printing is performed well.

Good: Only slight contamination of the thermal element occurs, and powders are not present, and as a result, printing is performed without a problem.

Poor: Contamination of the thermal head occurs, or powders are present, and as a result, printing is not performed well.

(3) Low Migration of Silicone

The back-surface layer of each heat-sensitive transfer recording material was stacked on a PET film having a thickness of 100 μm to apply a load of 20 kg per unit area of 7 cm×7 cm and was left to stand in a thermostatic chamber set at 50° C. for 72 hours. The PET film with the back-surface layer stacked thereon was taken out of the thermostatic chamber, and then whether or not migration of silicone occurred was checked by the surface energy of the PET having a thickness of 100 μm, on which the back-surface layer had been stacked, using a wetting tension test mixture. The check was performed in accordance with JIS K 6768, a wetting tension test mixture manufactured by FUJIFILM Wako Pure Chemical Corporation was applied on the film surface to determine the surface tension of the mixture required to just wet the film. Then, three-grade evaluation was performed according to the following criteria using the obtained value of the surface tension. That is, in measuring the surface tension by the above-described method, a relatively large value of the surface tension (wetting tension) of the mixture, required to just wet surface means that the surface to be an object of measurement on which the back-surface layer was stacked is relatively easily wetted, specifically means that the amount of silicone which migrated is small, and therefore when the surface tension is larger, it indicates that the back-surface layer exhibits lower migration.

Excellent: 36 mN/m or higher
Good: lower than 36 mN/m and 34 mN/m or higher
Poor: lower than 34 mN/m In the present invention, "excellent" and "good" are acceptable, and "poor" is not acceptable in the determination criteria.

(4) Adhesiveness

The adhesion between the back-surface layer of each heat-sensitive transfer recording material and the substrate sheet was evaluated by performing a peel test using a cellophane tape. Specifically, cellotape (registered trademark, manufactured by Nichiban Co., Ltd.) having a width of 24 mm was pasted using a pressure roller which was allowed to move back and forth once with a load of 1 kg to perform a peel test at 90°. Then, when the back-surface layer was not peeled, the back-surface layer was evaluated as acceptable (good), and when the back-surface layer was peeled, the back-surface layer was evaluated as not acceptable (poor).

TABLE 2-1 (A)

Combinations of resin compositions for back-surface layer Examples (Parts)

| | Example No. | 1 | 2 | 3 | 4 | 5 | 6 (Parts) |
|---|---|---|---|---|---|---|---|
| A | PU-1 (Si-9.6%) (NV = 30%) | 100 | | | | | |
| A | PU-2 (Si-20.8%) (NV = 30%) | | 100 | 100 | | | 100 |
| A | PU-3 (Si-31.3%) (NV = 30%) | | | | 100 | | |
| A | PU-4 (Si-48.5%) (NV = 30%) | | | | | 100 | |
| B | Polyester polyol-1 *3 | 30 | 30 | 60 | 60 | 120 | |
| B | Polyester polyol-2 *4 | | | | | | 30 |
| C | Isocyanate cross-linking agent *5 (NV = 75%) | 40 | 40 | 120 | 200 | 200 | 40 |
| | NCO/OH ratio in blended liquid | 1.048 | 1.048 | 1.571 | 1.571 | 1.310 | 6.286 |
| | Si Component % in blended liquid | 3.19 | 6.94 | 3.47 | 5.21 | 4.85 | 6.94 |
| | % by mass of resin A component | 33.3 | 33.3 | 16.7 | 16.7 | 10.0 | 33.3 |
| | % by mass of resin B component | 33.3 | 33.3 | 33.3 | 33.3 | 40.0 | 33.3 |
| | % by mass of cross-linking agent C component | 33.3 | 33.3 | 50.0 | 50.0 | 50.0 | 33.3 |

*3 Polyester polyol-1; molecular weight 500, hydroxyl value = 224.4 mgKOH/g, liquid at 25° C.
*4 TPEP 1030 (manufactured by Tai Chin Chemical Industry Co., Ltd.); molecular weight 3000, hydroxyl value = 37.4 mgKOH/g, liquid at 80° C.
*5 Coronate L (manufactured by Tosoh Corporation); solid content = 75%, NCO = 13.2%

TABLE 2-1 (B)

Evaluation results of Examples

| Example No. | 1 | 2 | 3 | 4 | 5 | 6 |
|---|---|---|---|---|---|---|
| Sticking properties | Acceptable (4) | Acceptable (5) | Acceptable (4) | Acceptable (5) | Acceptable (5) | Acceptable (5) |
| Resistance to cause contamination to thermal head | Excellent | Excellent | Excellent | Excellent | Excellent | Good |
| Low migration of silicone | Excellent | Good | Excellent | Good | Good | Good |
| Adhesiveness | Good | Good | Good | Good | Good | Good |

Examples 7 to 12 (Preparation of Resin Composition for Back-Surface Layer)

Resin compositions (blended liquids) for a back-surface layer of Examples 7 to 12 were obtained respectively in the same manner as in Example 1 except that the combination of materials was changed to the combinations as shown in Table 2-2(A).

Poly(hexamethylene carbonate)diol used in Example 7 is UH-50 (trade name, manufactured by UBE Corporation) and has a molecular weight of 500, a melting point of 33° C., and a hydroxyl value of 224 mgKOH/g, and falls under the resin B.

Polycaprolactone triol used in Example 8 is Placcel 305 (trade name, manufactured by Daicel Corporation) and is a liquid at 25° C. and has a molecular weight of 550, a viscosity of 1100 to 1600 mPa·s at 25° C., and a hydroxyl value of 305 mgKOH/g, and falls under the resin B.

S-LEC BX-1 (trade name, manufactured by SEKISUI CHEMICAL Co., Ltd.) used in Example 9 is a polyvinyl acetal resin whose hydroxy group content is 21 wt % and has a Tg of 95° C., and falls under the resin B.

Polyester polyol 1 used in Examples 10 to 12 is a reaction product of 1,4-butanediol and adipic acid and is a liquid at 25° C. and has a molecular weight of 500, a hydroxyl value (OHv) of 224.4 mgKOH/g, and falls under the resin B.

[Evaluations]

(Preparation of Heat-Sensitive Transfer Recording Material)

The resin compositions (blended liquids) for a back-surface layer of Examples 7 to 12, obtained according to the above-described combinations, were used respectively to form back-surface layers in the same manner as described in Examples 1 to 6, and further an ink layer was formed on the surface opposite to each back-surface layer in the same manner as described above, and thus heat-sensitive transfer recording materials of Examples 7 to 12, each having a different composition of the back-surface layer, were obtained.

(Printing Method and Evaluation Methods)

The heat-sensitive transfer recording materials of Examples 7 to 12, obtained above, were respectively mounted on a commercially available bar code printer and subjected to a mounting test by printing, and the sticking properties, the resistance to cause contamination to a thermal head, the low migration of silicone, and the adhesiveness between the back-surface layer and the substrate sheet were evaluated in the same manners as described above. Evaluation results are shown together in Table 2-2(B).

TABLE 2-2 (A)

Combination of resin compositions for back-surface layer of Examples

| | | 7 | 8 | 9 | 10 | 11 | 12 (Parts) |
|---|---|---|---|---|---|---|---|
| A | PU-2 (Si-20.8%) (NV = 30%) | 100 | 100 | 100 | 100 | | |
| A | PU-8 (Si-9.6%) (NV = 30%) | | | | | 100 | 100 |
| B | Polyester polyol-1 *[3] | | | | 30 | 30 | 30 |
| B | Poly (hexamethylene carbonate) diol *[6] | 30 | | | | | |
| B | Polycaprolactone triol *[7] | | 30 | | | | |
| B | Polyvinyl acetal resin *[8] | | | 30 | | | |
| C | Carbodiimide cross-linking agent *[9] | | | | | 7.1 | |
| C | Oxazoline cross-linking agent *[10] | | | | | | 5 |
| C | Isocyanate cross-linking agent *[5] (NV = 75%) | 40 | 80 | 100 | 32 | 33.3 | 33.3 |
| | NCO/OH ratio in blended liquid | 1.048 | 1.537 | 0.848 | 0.838 | 0.873 | 0.873 |
| | Si component % in blended liquid | 6.94 | 5.20 | 4.62 | 7.43 | 3.19 | 3.19 |
| | % by mass of resin A component | 33.3 | 25.0 | 22.2 | 35.7 | 33.3 | 33.3 |
| | % by mass of resin B component | 33.3 | 25.0 | 22.2 | 35.7 | 33.3 | 33.3 |
| | % by mass of cross-linking agent C | 33.3 | 50.0 | 55.6 | 28.6 | 33.3 | 33.3 |

*[3] Polyester polyol-1; molecular weight 500, hydroxyl value = 224.4 mgKOH/g, liquid at 25° C.
*[5] Coronate L (manufactured by Tosoh Corporation); solid content = 75%, NCO = 13.2%
*[6] UH-50 (manufactured by UBE Corporation); molecular weight 500, melting point 33° C., hydroxyl value = 224 mgKOH/g
*[7] Placcel 305 (manufactured by Daicel Corporation); molecular weight 550, liquid at 25° C., hydroxyl value = 305 mgKOH/g
*[8] S LEC BX 1 (manufactured by SEKISUI CHEMICAL CO., LTD.); hydroxyl group content 21 wt %, Tg = 95° C.
*[9] CARBODILITE V-09M (manfactured by Nisshinbo Chemical Inc.); solid content = 70%
*[10] EPOCROS RPS-1005 (manufactured by NIPPON SHOKUBAI CO., LTD.); solid content = 100%

TABLE 2-2 (B)

Evaluation results of Examples

| Example No. | 7 | 8 | 9 | 10 | 11 | 12 |
|---|---|---|---|---|---|---|
| Sticking properties | Acceptable (5) | Acceptable (5) | Acceptable (5) | Acceptable (4) | Acceptable (4) | Acceptable (4) |
| Resistance to cause contamination to thermal head | Excellent | Excellent | Excellent | Good | Good | Good |
| Low migration of silicone | Good | Good | Good | Good | Excellent | Excellent |
| Adhesiveness | Good | Good | Good | Good | Good | Good |

Comparative Examples 1 to 5 (Preparation of Resin Compositions for Back-Surface Layer for Comparison)

Resin compositions for a back-surface layer of Comparative Examples 1 to 5 were obtained in the same manner as in Example 1 except that the combination of materials was changed to the combinations as shown in Table 3-1(A). The resin A in "% by mass of resin A component" in Table 3-1(A) includes the resin A specified in the present invention, a polyurethane resin A" which is not modified with silicone, and a polyurethane resin A' which is modified with silicone but in which the amount of the Si component is out of the range specified in the present invention. Further, in the "Si Component % in blended liquid" in Table 3-1(A), the amount of silicone oil blended is described in parentheses, and the amount of the resin A' or the resin A" blended is described in brackets.

Comparative Example 1 is an example where the resin B is not used, and Comparative Example 2 is an example where the amount of the cross-linking agent C blended is smaller than the amount specified in the present invention, that is, 10% by mass based on 100% by mass of the total amount of the resin A, the resin B, and the cross-linking agent C. Comparative Example 3 is an example where an unmodified polyurethane resin is used without using the siloxane-modified resin A, and Comparative Example 4 is an example where an unmodified polyurethane resin and silicone oil are used without using the siloxane-modified resin A. Comparative Example 5 is an example where the amount of the siloxane component in the siloxane-modified polyurethane resin is 4.4%, which is less than 5%, that is, less than the amount specified in the present invention.

[Evaluations]

(Preparation of Heat-Sensitive Transfer Recording Material)

The resin compositions (blended liquids) for a back-surface layer of Comparative Examples 1 to 5, obtained according to the above-described combinations, were used respectively to form back-surface layers in the same manner as described above in Examples 1 to 6, and further an ink layer was formed on the surface opposite to each back-surface layer in the same manner as described above, and thus heat-sensitive transfer recording materials of Comparative Examples 1 to 5, each having a different composition of the back-surface layer, were obtained.

(Printing Method and Evaluation Methods)

The heat-sensitive transfer recording materials of Comparative Examples 1 to 5, obtained above, were respectively mounted on a commercially available bar code printer and subjected to a mounting test by printing, and the sticking properties, the resistance to cause contamination to a thermal head, the low migration of silicone, and the adhesiveness between the back-surface layer and the substrate sheet were evaluated in the same manners as described above. Evaluation results are shown together in Table 3-1(B).

TABLE 3-1 (A)

Combinations of resin compositions for back-surface layer of Comparative Examples

|   |   | 1 | 2 | 3 | 4 | 5 (Parts) |
|---|---|---|---|---|---|---|
| A | PU-1 (Si-9.6%) (NV = 30%) | 100 | 100 | | | |
| A" | PU-6 (Si-0.0%) (NV = 30%) | | | 100 | 100 | |
| A' | PU-7 (Si-4.4%) (NV = 30%) | | | | | 100 |
| B | Polyester polyol-1 *3 | | 60 | 60 | 60 | 60 |
|   | Dimethyl silicone oil *11 | | | | 10 | |
| C | Isocyanate cross-linking agent *5 (NV = 75%) | 40 | 13.3 | 120 | 120 | 120 |
|   | NCO/OH ratio in blended liquid | — | 0.174 | 1.571 | 1.571 | 1.571 |
|   | Si Component % in blended liquid | 4.79 | 2.87 | 0.00 | 0.00 | 0.74 |
|   | Si Component % in blended liquid (Si oil) | | | | (5.26) | |
|   | % by mass of resin A component (Si oil) | 50.0 | 30.0 | [16.7] | [15.8] (5.2) | [16.7] |
|   | % by mass of resin B component | 0 | 60.0 | 33.3 | 31.6 | 33.3 |
|   | % by mass of cross-linking agent C component | 50.0 | 10.0 | 50.0 | 47.4 | 50.0 |

*3 Polyester polyol-1; molecular weight 500, hydroxyl value = 224.4 mgKOH/g, liquid at 25° C.
*5 Coronate L (manufactured by Tosoh Corporation); solid content = 75%, NCO = 13.2%
*11 KF-96-100 cSt (manufactured by Shin-Etsu Chemical Co., Ltd.)

TABLE 3-1(B)

Evaluation results of Comparative Examples

| Comparative Example No. | 1 | 2 | 3 | 4 | 5 |
|---|---|---|---|---|---|
| Sticking properties | Acceptable (4) | Not acceptable (1) | Not acceptable (1) | Acceptable (4) | Not acceptable (2) |
| Resistance to cause contamination to thermal head | Excellent | Good | Poor | Excellent | Excellent |
| Low migration of silicone | Poor | Poor | Excellent | Poor | Excellent |
| Adhesiveness | Good | Good | Poor | Good | Poor |

Comparative Examples 6 to 11 (Preparation of Resin Compositions for Back-Surface Layer for Comparison)

Resin compositions for a back-surface layer of Comparative Examples 6 to 11 were obtained in the same manner as in Example 1 except that the combination of materials was changed to the combinations as shown in Table 3-2(A). The resin A in "% by mass of resin A component" in Table 3-2(A) includes the resin A specified in the present invention, a polyurethane resin A' which is modified with silicone but in which the amount of the Si component is out of the range specified in the present invention. In addition, in "Si Component % in blended liquid" in Table 3-2(A), the amount of silicone oil used is described in parentheses. Further, the resin B in "% by mass of resin B component" in Table 3-2(A) includes a resin B' having a glass transition point higher than the glass transition point specified in the present invention.

Comparative Example 6 is an example where the amount of the siloxane component in the siloxane-modified resin A is 59.7% which is larger than the amount of the siloxane component specified in the present invention. Comparative 7 is an example where the siloxane-modified resin A is not used, and Comparative Example 8 is an example where silicone oil is used without using the siloxane-modified resin A. Comparative Example 9 is an example where the amount of the cross-linking agent C blended is larger than the amount of the cross-linking agent specified in the present invention, that is, larger than 80% by mass based on 100% by mass of the total amount of the resin A, resin B, and the cross-linking agent C. Comparative Examples 10 and 11 are examples where the resin B' having a glass transition point (Tg) of 159° C. is used, that is, an example where a requirement that the glass transition point (Tg) is lower than 100° C. as specified for the resin B in the present invention is not satisfied.

[Evaluations]

(Preparation of Heat-Sensitive Transfer Recording Material)

The resin compositions (blended liquids) for a back-surface layer of Comparative Examples 6 to 11, obtained according to the above-described combinations, were used respectively to form back-surface layers in the same manner as described above in Examples 1 to 6, and further an ink layer was formed on the surface opposite to each back-surface layer in the same manner as described above, and thus heat-sensitive transfer recording materials of Comparative Examples 6 to 11, each having a different composition of the back-surface layer, were obtained.

(Printing Method and Evaluation Methods)

The heat-sensitive transfer recording materials of Comparative Examples 6 to 11, obtained above, were respectively mounted on a commercially available bar code printer and subjected to a mounting test by printing, and the sticking properties, the resistance to cause contamination to a thermal head, the low migration of silicone, and the adhesiveness between the back-surface layer and the substrate sheet were evaluated in the same manners as described above. Evaluation results are shown together in Table 3-2(B).

TABLE 3-2 (A)

Combinations of resin compositions for back-surface layer of Comparative Examples

| | | 6 | 7 | 8 | 9 | 10 | 11 (Parts) |
|---|---|---|---|---|---|---|---|
| A | PU-3 (Si-31.3%) (NV = 30%) | | | | | 100 | 100 |
| A | PU-4 (Si-48.5%) (NV = 30%) | | | | 100 | | |
| A' | PU-5 (Si-59.7%) (NV = 30%) | 100 | | | | | |
| B | Polyester polyol-1 *3 | 60 | 100 | 100 | | | |
| B | Polyester polyol-1 *4 | | | | 100 | | |
| B' | Cellulose acetate propionate resin *12 | | | | | 270 | 60 |
| | Dimethyl silicone oil *11 | | | 15 | | | |
| C | Isocyante cross-linking agent *5 (NV = 75%) | 120 | 150 | 150 | 700 | 40 | 40 |
| | NCO/OH ratio in blended liquid | 1.571 | 1.179 | 1.179 | 33.00 | 0.158 | 0.712 |
| | Si Component % in blended liquid | 9.95 | 0.00 | 0.00 | 2.22 | 2.84 | 7.82 |
| | Si Component % (Si oil) in blended liquid | | | (6.59) | | | |
| | % by mass of resin A component (Si oil) | [16.7] | 0 | 0 (6.5) | 4.6 | 9.1 | 25 |
| | % by mass of resin B component | 33.3 | 47.1 | 44.0 | 15.3 | [81.8] | [50] |
| | % by mass of cross-linking agent C component | 50.0 | 52.9 | 49.5 | 80.2 | 9.1 | 25 |

*3 Polyester polyol-1; molecular weight 500, hydroxyl value = 224.4 mgKOH/g, liquid at 25° C.
*4 TPEP 1030 (manufactured by Tai Chin Chemical Industry Co., Ltd.); molecular weight 3000, hydroxyl value = 37.4 mgKOH/g, liquid at 80° C.
*5 Coronate L (manufactured by Tosoh Corporation); solid content = 75%, NCO = 13.2%
*11 KF-96-100 cSt (manufactured by Shin-Etsu Chemical Co., Ltd.)
*12 CAP-504-0.2 (manufactured by Eastman Chemical Company); hydroxy group content = 5 wt %, Tg = 159° C.

TABLE 3-2 (B)

Evaluation results of Comparative Examples

| Comparative Example No. | 6 | 7 | 8 | 9 | 10 | 11 |
|---|---|---|---|---|---|---|
| Sticking properties | Acceptable (5) | Not acceptable (1) | Acceptable (4) | Not acceptable (3) | Acceptable (5) | Acceptable (5) |
| Resistance to cause contamination to thermal head | Good | Poor | Excellent | Poor | Poor | Poor |
| Low migration of silicone | Poor | Excellent | Poor | Excellent | Excellent | Good |
| Adhesiveness | Good | Poor | Good | Good | Good | Good |

The comparison between the evaluation results of Examples in Table 2 above and the evaluation results of Comparative Examples in Table 3 above can confirm the followings.

As shown in Comparative Example 3, Comparative Example 5, and Comparative Example 7, when a back-surface layer is formed in examples where a polysiloxane (silicone component) is not contained in the blended liquid and the example where the amount of the polysiloxane (silicone component) blended is small the back-surface layer is inferior in heat resistance and sticking occurs. As shown in Comparative Example 4 and Comparative Example 8, even when the siloxane-modified urethane- or urea-based resin is not contained in the blended liquid, a back-surface layer which has heat resistance and has reduced sticking is obtained by using silicone oil. However, in that case, the back-surface layer gives favorable results regarding the contamination to a head and the adhesiveness, but there is a problem that silicone migrates and therefore low migration cannot be achieved.

In addition, as shown in Comparative Example 6, when the amount of the polysiloxane in the siloxane-modified urethane- or urea-based resin is larger than that specified in the present invention, a back-surface layer having high heat-resistant sliding properties and reduced sticking and causing no problem in contamination to a head and adhesiveness is obtained, but silicone migrates and therefore low migration cannot be achieved. On the other hand, as shown in Comparative Example 5, when the amount of the polysiloxane component in the siloxane-modified urethane- or urea-based resin is smaller than that specified in the present invention, the back-surface layer is inferior in heat-resistant sliding properties and sticking occurs, and further, the back-surface layer is inferior in adhesiveness.

Further, as shown in Comparative Examples 10 and 11, the resin B' having high Tg is used together with the siloxane-modified urethane- or urea-based resin, a back-surface layer exhibiting high heat-resistant sliding properties is obtained and there is no problem of sticking. However, in that case, there is a problem that powders adhere to a thermal head and therefore contamination to a head occurs.

Furthermore, as shown in Comparative Example 1, when the resin B is not blended, there is a problem that silicone migrates and therefore low migration cannot be achieved. As shown in Comparative Example 2, when the amount of the cross-linking agent C blended is smaller than that specified in the present invention, there is a problem that a formed back-surface layer is inferior in heat-resistant sliding properties and tends to cause sticking to occur, and in addition, there is also a problem that silicone migrates and therefore low migration cannot be achieved. On the other hand, as shown in Comparative Example 9, when the amount of the cross-linking agent C blended is larger than that specified in the present invention, the back-surface layer is inferior in heat-resistant sliding properties and tends to cause sticking to occur, and in addition, contamination to a head is observed.

As shown in Comparative Example 3, in the example where an unmodified urethane resin which is not modified with a siloxane, the resin B, and the cross-linking agent is used, migration of silicone does not occur, but the back-surface layer is inferior in contamination to a head and, further, inferior to adhesiveness to the substrate.

In contrast, as shown in Examples, when the resin composition for a back-surface layer satisfies all the requirements specified in the present invention, it is made possible to form a back-surface layer which has high heat-resistant sliding properties and reduced sticking, does not cause silicone to migrate, making it possible to achieve low migration, and has no problem in contamination to a head and adhesiveness.

The invention claimed is:

1. A resin composition for a back-surface layer, to be used for forming a back-surface layer of a heat-sensitive transfer recording material having a heat-sensitive transfer recording layer provided on one surface of a substrate sheet and a back-surface layer provided on the other surface, the resin composition comprising, as film-forming components:
   a siloxane-modified urethane- or urea-based resin A;
   a resin B; and
   a cross-linking agent C, wherein
   the resin A comprises a polysiloxane component in a range of 5 to 55% by mass,
   the resin B is at least any one selected from the group consisting of polyester polyols, polycarbonate polyols, polyether polyols, caprolactone polyols, polyvinyl acetals, polyvinyl butyral, epoxy polyols, and silicone polyols each having at least one active-hydrogen-containing group in one molecule and having a glass transition point (Tg) of lower than 100° C., and
   when the total amount of the resin A, resin B, and the cross-linking agent C is assumed to be 100% by mass, the resin A is contained within a range of 1 to 79% by mass, the resin B is contained within a range of 1 to 79% by mass, and the cross-linking agent C is contained within a range of 20 to 80% by mass.

2. The resin composition for a back-surface layer according to claim 1, wherein the resin B has a hydroxyl value (OHv) of 22 to 900 mgKOH/g.

3. The resin composition for a back-surface layer according to claim 1 or 2, wherein the resin B is at least any one selected from the group consisting of polyester polyols, polycarbonate polyols, and polyether polyols.

4. The resin composition for a back-surface layer according to any one of claims 1 to 3, wherein the resin B has a molecular weight of 200 to 100000.

5. The resin composition for a back-surface layer according to any one of claims 1 to 4, wherein
   the resin A has a reaction product formed of, as components for forming the reaction product, a polysiloxane compound (a) having at least one active-hydrogen-containing group in one molecule, an isocyanate compound (b), and a polyol and/or a polyamine (c), or the resin A has a reaction product formed of, as components for forming the reaction product, an isocyanate compound (b) and a polysiloxane polyol and/or a polysiloxane polyamine (c'); and
   the reaction product is obtained by reacting isocyanate groups and all of the active-hydrogen-containing groups at a molar ratio of NCO/active-hydrogen-containing group=0.9 to 1.2 and has a number average molecular weight of 2000 to 500000.

6. The resin composition for a back-surface layer according to any one of claims 1 to 5, wherein the cross-linking agent C is a polyisocyanate, and the polyisocyanate is blended in such a way that a ratio of an isocyanate group of the cross-linking agent to the active-hydrogen-containing group of the resin B satisfies NCO/active-hydrogen-containing group=0.3 to 30.

7. The resin composition for a back-surface layer according to any one of claims 1 to 6, wherein the cross-linking agent C comprises a carbodiimide cross-linking agent or an oxazoline cross-linking agent.

8. The resin composition for a back-surface layer according to any one of claims 1 to 7, wherein the resin composition is of a two-liquid type consisting of a mixed liquid comprising the resin A and the resin B, and a liquid comprising the cross-linking agent C, or is of a three-liquid type consisting of a liquid comprising the resin A, a liquid comprising the resin B, and a liquid comprising the cross-linking agent C.

9. A heat-sensitive transfer recording material comprising:
   a heat-sensitive transfer recording layer provided on one surface of a substrate sheet; and
   a back-surface layer provided on the other surface, wherein the back-surface layer is formed of the resin composition for a back-surface layer according to any one of claims 1 to 8.

* * * * *